(12) United States Patent  
Su

(10) Patent No.: US 10,203,774 B1  
(45) Date of Patent: Feb. 12, 2019

(54) HANDHELD DEVICE AND CONTROL METHOD THEREOF

(71) Applicant: PIXART IMAGING INC., Hsin-Chu (TW)

(72) Inventor: Tse-Chung Su, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/655,340

(22) Filed: Jul. 20, 2017

(51) Int. Cl.  
*G06F 3/0354* (2013.01)  
*G06F 3/041* (2006.01)

(52) U.S. Cl.  
CPC ............ *G06F 3/0354* (2013.01); *G06F 3/041* (2013.01)

(58) Field of Classification Search  
CPC ............... G06F 3/0354; G06F 3/03541; G06F 3/03543; G06F 3/03547  
USPC .................................................. 345/163–166  
See application file for complete search history.

(56) References Cited

U.S. PATENT DOCUMENTS

| 5,432,531 | A | 7/1995 | Calder et al. |
| 2008/0278445 | A1 | 11/2008 | Sweetser et al. |
| 2010/0283753 | A1* | 11/2010 | Ohshita ............... G06F 3/03547 345/173 |
| 2013/0176264 | A1* | 7/2013 | Alameh ................. G06F 3/038 345/174 |
| 2013/0335323 | A1 | 12/2013 | Huang et al. |
| 2014/0118263 | A1* | 5/2014 | Tajima ................ G06F 3/04895 345/168 |
| 2016/0274722 | A1* | 9/2016 | Putzolu ................. G06F 1/1616 |
| 2016/0364029 | A1* | 12/2016 | Miller ................. G06F 3/03547 |
| 2017/0185177 | A1* | 6/2017 | Rane ..................... G06F 3/03547 |

* cited by examiner

*Primary Examiner* — Stephen G Sherman  
(74) *Attorney, Agent, or Firm* — Li & Cai Intellectual Property (USA) Office

(57) ABSTRACT

A handheld device including: a body with an operating surface; a touch sensor for sensing a touch on the operating surface to output a touch signal; a displacement sensor configured with the body for sensing a displacement of the body to output a displacement signal; and a processor receiving the touch signal to respectively generate a control command and disable the touch signal for a first time duration when the displacement signal is larger than a moving threshold.

20 Claims, 3 Drawing Sheets

HANDHELD DEVICE AND CONTROL METHOD THEREOF

BACKGROUND

1. Technical Field

The present disclosure relates to a handheld device, and in particular, to a handheld device with a control method for adjusting a gesture command.

2. Description of Related Art

In order to meet ergonomic needs, a surface of a touch mouse can be designed to fit a user's palm. In this case, a finger shape of a finger detected from the surface of the touch mouse is different from that of a fingertip detected by a touch panel. In addition, when the user operates the touch mouse, the fingers always are put on the surface to operate the mouse, which may result in erroneous gesture commands from inadvertent finger motions of the user.

SUMMARY

A handheld device and control method thereof of the instant disclosure can use physical buttons and touch detection to assist in adjustment of a gesture command so as to avoid the occurrence of erroneous actions.

An exemplary embodiment of the instant disclosure provides a handheld device including: a body with an operating surface; a touch sensor for sensing a touch on the operating surface to output a touch signal; a displacement sensor configured with the body for sensing a displacement of the body to output a displacement signal; and a processor receiving the touch signal to respectively generate a control command and disable the touch signal for a first time duration when the displacement signal is larger than a moving threshold.

An exemplary embodiment of the instant disclosure provides a control method applied to a handheld device having a body with an operating surface, a touch sensor, a displacement sensor, and a processor, the processor executing the method including: receiving a touch signal transmitted by the touch sensor for sensing a touch on the operating surface to generate a control command; disabling the touch signal for a first time duration when a displacement signal transmitted by the displacement sensor for sensing a displacement of the body is larger than a moving threshold.

For further understanding of the instant disclosure, reference is made to the following detailed description illustrating the embodiments of the instant disclosure. The description is only for illustrating the instant disclosure, not for limiting the scope of the claims.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
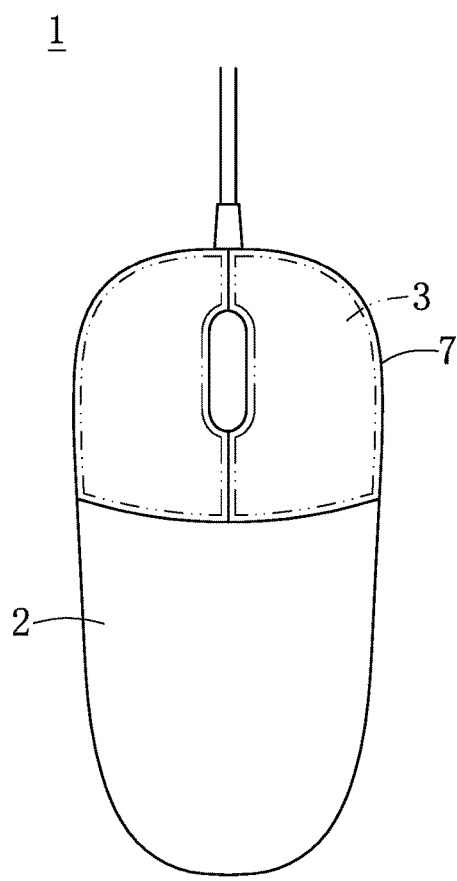
FIG. 1 shows a diagram of a handheld device of the instant disclosure.
Figure 2:
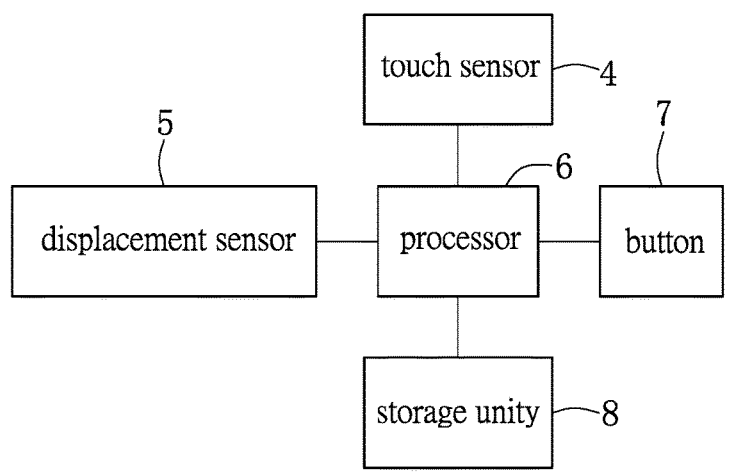
FIG. 2 is a block diagram of a handheld device according to an embodiment of the instant disclosure.

FIG. 1 shows a diagram of a handheld device of the instant disclosure. FIG. 2 is a block diagram of a handheld device according to an embodiment of the instant disclosure. Referring to FIGS. 1 and 2, the handheld device 1 includes a body 2 with an operating surface 3, a touch sensor 4, a displacement sensor 5, a processor 6, at least one button 7 and a storage unit 8. The touch sensor 4 senses a touch on the operating surface to output a touch signal. The displacement sensor 5 is configured with the body 2 and senses a displacement of the body 2 to output a displacement signal. The button 7 outputs a button signal while being pressed. The processor 6 connects to the touch sensor 4 to receive the touch signal. The processor 6 connects to the displacement sensor 5 to receive the displacement signal. The processor 6 connects to the button 7 to receive the button signal. The processor 6 connects to the storage unit 8 to read a plurality of values in the storage unit 8 and compare the values with a measurement. The handheld device 1 may be a touch mouse, a smart phone, a touch panel, etc., but the instant disclosure is not limited thereto.

When the processor 6 receives the touch signal, the processor 6 generates a control command. For example, if the handheld device 1 is the touch mouse as shown in FIG. 1, the control command may be sent to a host to scroll a page on a website or execute a shortcut gesture. If the handheld device 1 is a smart phone, the processor 6 may execute the control command for sliding, clicking or rotating on a screen.

In one embodiment, the handheld device 1 is a touch mouse. The processor 6 receives the touch signal and the displacement signal. When the displacement signal is larger than a moving threshold, the processor 6 disables the touch sensor 4 and/or the touch signal for a first time duration, such as 1 microsecond, 1 millisecond, 1 second, etc., but the instant disclosure is not limited thereto.

In this case, the touch signal may be taken as an inadvertent action of a user. The displacement signal represents the displacement of the body 2, such as a distance between two different locations or two different coordinates. The storage unit 8 stores a plurality of moving threshold values, and the moving threshold stored in the storage unit 8 is set as one of the plurality of moving threshold values based on an operating mode of the handheld device 1.

When the processor 6 determines that the displacement signal is larger than the moving threshold, the processor 6 accumulates a plurality of displacement signals during a moving time duration and compares the accumulated displacement signals to the moving threshold. The storage unit 8 stores a plurality of moving time duration values, and the moving time duration stored in the storage unit 8 is set as one of the plurality of moving time duration values based on an operating mode of the handheld device 1. It should be noted that a time length of the first time duration may be the same as that of the moving time duration, but the instant disclosure is not limited thereto.

In addition, the processor 6 disabling the touch signal for the first time duration may represent that the processor 6 stops generating the control command formed by the received touch signal for the first time duration, the processor 6 stops receiving the touch signal for the first time duration, or the processor 6 resets the received touch signal to indicate no-touch for the first time duration if the received touch signal has not formed the control command.

For example, the handheld device 1 is the touch mouse. When the user moves the touch mouse as shown in FIG. 1, the user may inadvertently touch the operating surface 3. The processor 6 receives the touch signal from sensing the touch on the operating surface via the touch sensor 4 and receives the displacement signal from sensing a displacement of the touch mouse via the displacement sensor 5. When the processor 6 determines that the displacement signal (e.g. a distance signal representing a distance such as 3 cm) is larger than the moving threshold (e.g. 0.5 cm), the processor 5 disables the touch sensor 4 and the touch signal for the first time duration regardless of whether the control command has been formed by the sensing signal. In this way, the processor 5 determines that the user is only moving the touch mouse and is not performing an intentional touch on the operating surface 3. It should be noted that the distance signal may represent that the touch mouse moves a distance relative to the desktop or a mouse cursor moves several pixels on an imaging array in a screen.

Figure 3:
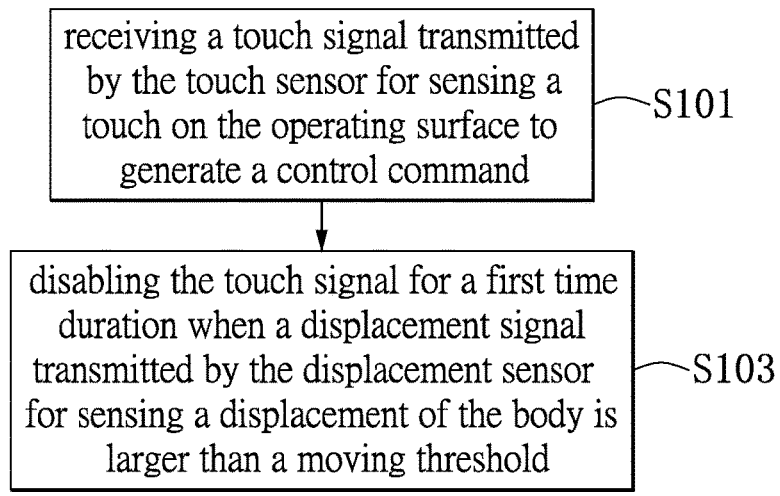
FIG. 3 is a flow chart of a control method according to an embodiment of the instant disclosure.

FIG. 3 is a flow chart of a control method according to an embodiment of the instant disclosure. The processor 6 executes the control method including the steps of S101: receiving a touch signal transmitted by the touch sensor 4 for sensing a touch on the operating surface 3 to generate a control command; S103: disabling the touch signal for a first time duration when a displacement signal transmitted by the displacement sensor 5 for sensing a displacement of the body 2 is larger than a moving threshold.

If the handheld device 1 is a touch mouse, the user may click the button 7 on the touch mouse, move the touch mouse, and touch the operating surface 3. When the user moves the touch mouse, the user may touch the operating surface 3 inadvertently. At this time, the processer 6 receives the touch signal and the displacement signal simultaneously. When the processor 6 determines that the displacement signal is larger than the moving threshold, the processor 6 disables the touch sensor 4 and/or the touch signal for the second time duration.

In one embodiment, the handheld device 1 is a touch mouse. The button 7 outputs a button signal while being pressed and the processor 6 receives the button signal. When the user clicks the button 7, the user will also touch the operating surface 3 inadvertently. At this time, the processer 6 receives the touch signal and the button signal simultaneously. When the processor 6 determines that the button 7 is pressed, the processor 6 disables the touch sensor 4 and the touch signal for a second time duration and outputs a button control signal. It should be noted that a time length of the second time duration may be the same as that of the first time duration, but the instant disclosure is not limited thereto.

In this case, the touch signal may be taken as an inadvertent action of the user. The processor 6 disabling the touch signal for the second time duration may represent that the processor 6 stops generating the control command formed by the received touch signal for the second time duration, the processor 6 stops receiving the touch signal for the first time duration, or resets the received touch signal to indicate no-touch for the second time duration if the received touch signal has not formed the control command.

For example, when the user clicks the button 7, the user will inadvertently touch the operating surface 3. The processor 6 receives the touch signal from sensing the touch on the operating surface via the touch sensor 4 and receives the button signal of the button 7 being pressed. When the processor 6 determines that the button is pressed, the processor 5 disables the touch sensor 4 and/or the touch signal for the second time duration regardless of whether the control command has been formed by the sensing signal. In this way, the processor 5 determines that the user is clicking the button 7 and is not performing an intentional touch on the operating surface 3.

Figure 4:
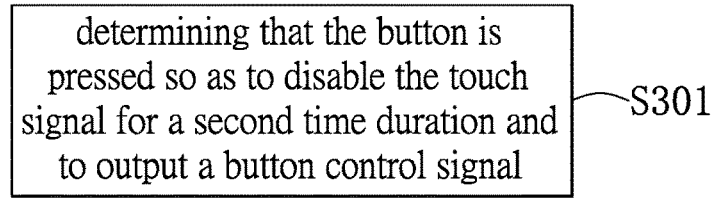
FIG. 4 is a flow chart of a control method according to another embodiment of the instant disclosure.

FIG. 4 is a flow chart of a control method according to another embodiment of the instant disclosure. The processor 6 executes the control method including the step of S301: determining that the button 7 is pressed so as to disable the touch signal for a second time duration and to output a button control signal.

When the processor 6 determines that the button 7 is being pressed by the user, the processor 6 disables the touch sensor 4 and/or the touch signal for the second time duration.

Based on the above-mentioned, the handheld device and control method thereof of the instant disclosure can use physical buttons, a touch detection and a displacement of the handheld device to assist adjustment of a gesture command so as to avoid an occurrence of erroneous actions.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A handheld device, comprising:
a body with an operating surface;
a touch sensor for sensing a touch on the operating surface to output a touch signal;
a displacement sensor configured with the body for sensing a displacement of the body to output a displacement signal; and
a processor receiving the touch signal to respectively generate a control command and disable the touch signal for a first time duration when the displacement signal is larger than a moving threshold;
wherein when the processor determines that the displacement signal is larger than the moving threshold, the processor accumulates a plurality of displacement signals during a moving time duration and compares the accumulated displacement signals to the moving threshold; and
wherein the moving threshold is set as one of a plurality of moving threshold values based on an operating mode of the handheld device.

2. The handheld device according to claim 1, wherein when the processor disables the touch signal, the processor stops generating the control command for the first time duration.

3. The handheld device according to claim 1, wherein when the processor disables the touch signal, the processor stops receiving the touch signal for the first time duration.

4. The handheld device according to claim 1, wherein when the processor disables the touch signal, the processor resets the received touch signal to indicate no-touch for the first time duration.

5. The handheld device according to claim 1, wherein when the displacement signal is larger than the moving threshold, the processor disables the touch sensor for the first time duration.

6. The handheld device according to claim 1 further comprising:
   at least one button connected to the processor and which outputs a button signal to the processor while being pressed;
   wherein the processor determines that the button is pressed so as to disable the touch signal for a second time duration and to output a button control signal.

7. The handheld device according to claim 1, wherein the moving threshold is stored in a storage unit.

8. The handheld device according to claim 7, wherein the storage unit includes the plurality of moving threshold values.

9. The handheld device according to claim 1, wherein the moving time duration is stored in a storage unit.

10. The handheld device according to claim 9, wherein the storage unit includes a plurality of moving time duration values, and the moving time duration is set as one of the plurality of moving time duration values based on the operating mode of the handheld device.

11. A control method applied to a handheld device having a body with an operating surface, a touch sensor, a displacement sensor, and a processor, the processor executing the method comprising:
   receiving a touch signal transmitted by the touch sensor for sensing a touch on the operating surface to generate a control command;
   disabling the touch signal for a first time duration when a displacement signal transmitted by the displacement sensor for sensing a displacement of the body is larger than a moving threshold;
   wherein when the processor determines that the displacement signal is larger than the moving threshold, the processor accumulates a plurality of displacement signals during a moving time duration and compares the accumulated displacement signals to the moving threshold; and
   wherein the moving threshold is set as one of a plurality of moving threshold values based on an operating mode of the handheld device.

12. The control method according to claim 11, wherein when the processor disables the touch signal, the processor stops generating the control command for the first time duration.

13. The control method according to claim 11, wherein when the processor disables the touch signal, the processor stops receiving the touch signal for the first time duration.

14. The control method according to claim 11, wherein when the processor disables the touch signal, the processor resets the received touch signal to 0 for the first time duration.

15. The control method according to claim 11, wherein when the displacement signal is larger than the moving threshold, the processor disables the touch sensor for the first time duration.

16. The control method according to claim 11, further comprising:
   determining that at least one button is pressed so as to disable the touch signal for a second time duration and to output a button control signal;
   wherein the button outputs a button signal to the processor while being pressed.

17. The control method according to claim 11, wherein the moving threshold is stored in a storage unit.

18. The control method according to claim 17, wherein the storage unit includes the plurality of moving threshold values.

19. The control method according to claim 11, wherein the moving time duration is stored in a storage unit.

20. The control method according to claim 19, wherein the storage unit includes a plurality of moving time duration values, and the moving time duration is set as one of the plurality of moving time duration values based on the operating mode of the handheld device.

* * * * *